United States Patent [19]

Opas

[11] Patent Number: 5,710,998
[45] Date of Patent: Jan. 20, 1998

[54] METHOD AND APPARATUS FOR IMPROVED ZERO INTERMEDIATE FREQUENCY RECEIVER LATENCY

[75] Inventor: George Francis Opas, Park Ridge, Ill.

[73] Assignee: Motorola, Inc., Schaumburg, Ill.

[21] Appl. No.: 574,542

[22] Filed: Dec. 19, 1995

[51] Int. Cl.$^6$ ................................................ H04B 1/16
[52] U.S. Cl. .................. 455/324; 455/208; 455/255; 455/310
[58] Field of Search ........................... 455/209, 208, 455/314, 315, 324, 207, 316, 196.1, 205, 206, 258, 310, 255; 375/329; 329/304, 306

[56] References Cited

U.S. PATENT DOCUMENTS 4,523,324  6/1985  Marshall ......................... 455/324
4,653,117  3/1987  Heck ............................... 455/316
4,944,025  7/1990  Gehring et al. .................. 455/207
5,003,621  3/1991  Gailus ............................. 455/324

*Primary Examiner*—Nguyen Vo
*Attorney, Agent, or Firm*—Kevin A. Buford

[57] ABSTRACT

A transceiver (10) in a first embodiment includes a zero intermediate frequency (ZIF) receiver (11), which achieves high throughput operation by reducing receiver latency time due to receiver response within a receiver pass band to carrier spectral components of a modulated carrier frequency. During a receive mode, a receiver local oscillator (LO) frequency is offset from the carrier frequency within the receiver pass band, preferably as determined by worst case errors in the carrier frequency and the LO frequency. During a transmit mode, the receiver LO frequency is modulated in such a way as to suppress the LO center frequency component in the modulated spectrum.

7 Claims, 1 Drawing Sheet

METHOD AND APPARATUS FOR IMPROVED ZERO INTERMEDIATE FREQUENCY RECEIVER LATENCY

FIELD OF THE INVENTION

This invention relates in general to communication systems, and more particularly, zero intermediate frequency (ZIF) receivers.

BACKGROUND OF THE INVENTION

ZIF receivers are known in the art. ZIFs directly demodulate RF (radio frequency) signals from an RF carrier to baseband, requiring a receive local oscillator (LO) input which when applied to internal mixers of the ZIF receiver down-converts the RF signals modulated on the common carrier frequency. A ZIF receiver includes baseband receiver pass band characteristics, including an undesirable null response within a narrow band of frequencies including zero Hz. The null response of the receiver pass band is commonly a consequence of AC coupled circuitry within the receiver intended to eliminate DC levels occurring in ZIF receiver internal in-phase and quadrature circuits associated with demodulation. Additional nulling circuitry may also be provided to balance any DC offset levels in the in-phase and quadrature circuits to prevent distortion of the demodulated output of the ZIF receiver.

This can be a problem, e.g., in a typical wireless system like a local area network (LAN) that has signaling patterns modulated onto a transmitted signal used to initiate a communications function (e.g., a dotting sequence). Modulating the carrier frequency with such patterns will generate spectral components having discrete frequencies at significant fractions (e.g., ½) of the system data rate. This is in contrast to the normal data modulation which is random and imposes a quasi-continuous, shaped spectrum on the carrier. With signaling pattern modulation, any strong carrier spectral content near the receive local oscillator frequency is down convened to a frequency near DCZ. Because typical system frequency errors are compatible with system bandwidths and data rates, this is significant for the center carrier frequency component. In a transient situation where a modulated carrier having such a spectrum is suddenly applied to the ZIF receiver, the spectrum initially passes through to the ZIF detector and is properly demodulated. However, after a period of time determined by both the high-pass corner of the aforementioned AC coupling circuitry and the time constant of the DC offset nulling circuitry, the carrier frequency component near DC is significantly attenuated. This can cause severe distortion in the demodulated signal pattern-generally rendering it useless for purposes such as sync and clock recovery.

Another common application affected is switched antenna diversity reception, implemented to provide the best available received signal by having two antennas alternately sampled over several repeated cycles. The sampling dwell time on each antenna is sufficient to permit an evaluation of the quality of the signal received on that antenna. The evaluation can be a simple signal strength measurement, or more complex evaluation such as an error measurement. The sampling dwell time typically includes several cycles of the aforementioned signaling pattern and can be a significant fraction of the transient response time associated with the ZIF null response. Under these timing conditions, and with the downconverted carrier frequency near DC, the antennas are switching between stronger and weaker signals, effectively presenting the ZIF with two DC levels resembling a DC-offset square wave. The equivalent high-pass action of the ZIF baseband response removes the DC offset which causes both the stronger and weaker signals to appear to have the same strength or quality so that a correct diversity decision is difficult or cannot be made.

Thus, a signal having a strong carrier frequency spectral component within the null response of the ZIF receiver can either have its modulated information destroyed or it can cause the receiver to be "blind" to significant differences in signal strength. One technique which has been employed to prevent carrier spectral content from causing such effects involves off-setting the receiver local oscillator frequency from the carrier frequency by an amount greater than the receiver half-bandwidth during transceiver receive mode (see Gehring, et. al., U.S. Pat. No. 4,944,025). This prevents down converted carrier spectral content from coinciding with the receiver null, but at the expense of receiver sensitivity and selectivity due to increased receiver noise bandwidth.

A further problem may arise in single frequency duplex transceivers, i.e., systems that transmit and receive RF signals using a common nominal carrier frequency. The problem arises during the transmit mode of the transceiver. For example, in non-voice data communications systems, it is typically necessary to minimize the transmit-to-receive turnaround time due to system throughput requirements. Unfortunately, with the transmitter operating on the same frequency as the receiver, enough DC spectral content may be generated by the down conversion to create a null-related transient desensitization condition—even though random data is being modulated and no strong carrier spectral component exists. Large amounts of isolation between the transmitter and receiver would be necessary to prevent transmit carrier spectral content from coupling to the receiver, but this may be difficult to achieve in practice. Methods of preventing desensitization which involve removing power from the receiver, disconnecting the baseband filters and holding their operating state, or shifting the frequency of the receive local oscillator to some other frequency during the transmit mode can unfortunately involve excessively long periods of time to re-establish stable operating conditions associated with the ZIF receiver and the receive local oscillator in receive mode.

To beneficially employ ZIF receiver advantages, particularly in high-throughput data communications systems, a need remains for an improved receiver architecture, including one which both prevents ZIF null-related responses from undermining receive performance, and permits fast transition from transmit mode to receive mode.

DETAILED DESCRIPTION OF THE DRAWINGS

These problems and others are solved by the improved method and apparatus according to the invention. A presently preferred embodiment is a transceiver including a zero intermediate frequency receiver which, during a receive mode, provides a receiver local oscillator (LO) frequency offset from the carrier frequency within the receiver pass band, preferably as determined by worst case errors in the carrier frequency and the LO frequency. During a transmit mode, the receiver LO frequency is modulated in such a way as to suppress the LO center frequency component in the modulated spectrum. By minimizing the receiver latency, the transceiver can achieve higher throughput.

Figure 1:
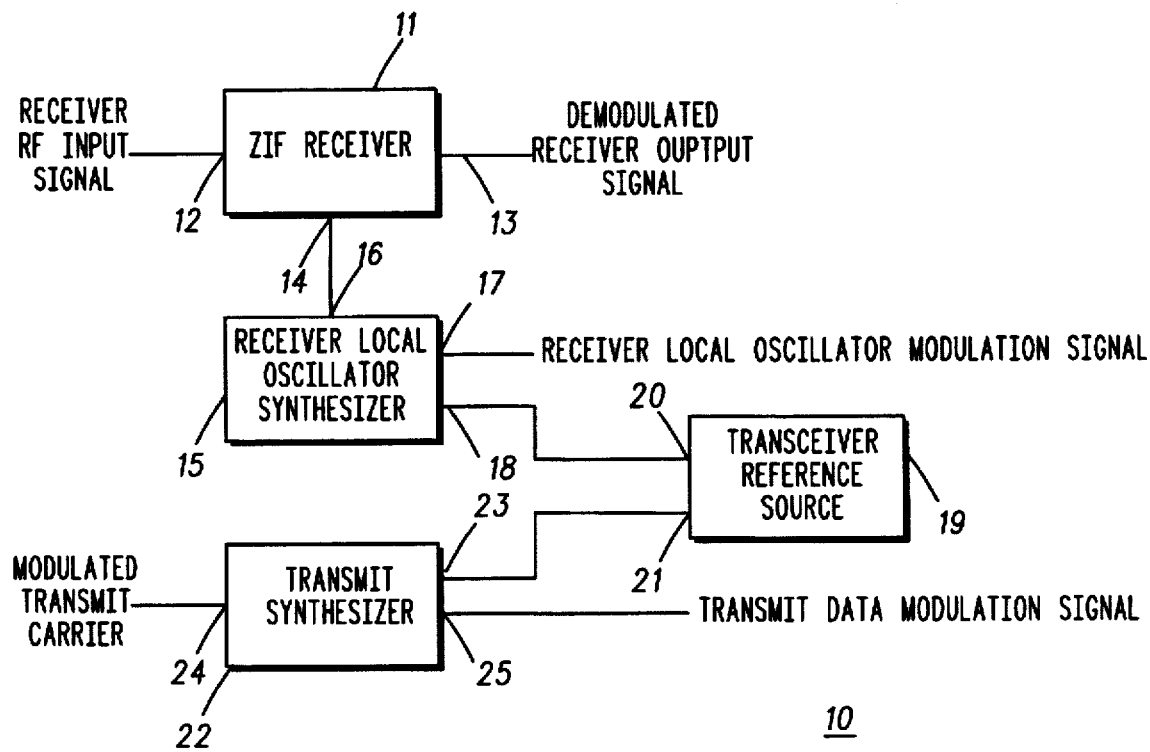
FIG. 1 is a block diagram of one embodiment of the invention illustrating circuitry of a high throughput single frequency duplex transceiver with a zero intermediate frequency (ZIF) receiver.

Turning now to FIG. 1, a high-throughput single frequency duplex transceiver 10 is illustrated. Transceiver 10 includes zero intermediate frequency (ZIF) receiver 11 having a first input 12 for receiving a carrier frequency input. A receiver RF input signal is a modulated carrier frequency input, which ZIF receiver 11 demodulates. In one embodiment of the invention, a receiver local oscillator (LO) source is a receiver LO synthesizer 15 having an output 16 which couples a receive LO frequency to a second input 14 of ZIF receiver 11. Receive LO synthesizer 15 has a modulation input 17 for receiving a modulating signal. Also included as a transmit carrier source is a transmit synthesizer 22, which provides a transmit carrier output frequency in the form of a modulated transmit carrier from a transmit output 24.

A transceiver reference source 19 is shown having a first reference output 20 coupled to a reference input 18 to the receiver local oscillator synthesizer 15, providing a first reference signal, and a second reference output 21 coupled to a reference input 23 of the transmit synthesizer 22, providing a second reference signal. First reference output 20 and second reference output 21 are shown in a general arrangement which allows reference signals of different frequencies to be provided to receiver LO synthesizer 15 and transmit synthesizer 22. Preferably the reference signals of the same frequency are provided by transceiver source 19 to receive LO synthesizer 15 and transmit synthesizer 22, and are provided by a single common reference output (not shown) of transceiver reference source 19.

A description of a preferred embodiment of transceiver 10 is as follows. In a receive mode, the receiver RF input signal is coupled to first input 12 of ZIF receiver 11. As noted above, the receiver RF input signal is a modulated carrier frequency. The modulated carrier frequency has an associated carrier frequency error which includes a range of frequencies from a minimum carrier frequency to a maximum carrier frequency as part of a system specification. A receiver LO signal is coupled to second input 14. The receiver LO signal has a nominal LO frequency with an associated LO frequency error which includes a range of frequencies from a minimum LO frequency to a maximum LO frequency, again specified by an applicable system specification. In the present embodiment, the receiver LO frequency is synthesized using the first reference signal from first reference output 20 of transceiver reference source 19 as a reference. The nominal receiver LO frequency is offset in frequency by an offset amount from the nominal carrier frequency.

The offset amount is determined by frequency errors of the carrier frequency and the receive local oscillator frequency. The offset amount is determined to be greater than a sum of an absolute value of frequency error in the receive local oscillator and an absolute value of the frequency error in the carrier resulting from one of the minimum or maximum of the carrier frequency and the minimum or maximum of the receive local oscillator frequency. By setting the nominal receiver LO frequency to a lower frequency than the nominal carrier frequency, the frequency offset is set to an adequate margin greater than a separation between the minimum carrier frequency and the actual maximum receive local oscillator frequency. Alternatively, by setting the nominal receive LO frequency to a higher frequency than the nominal carrier frequency, the frequency offset is set to an adequate margin greater than a separation between the maximum carrier frequency and the minimum receive local oscillator frequency. The receiver LO signal is used by mixers (not shown) within ZIF receiver 11 to translate spectral components of the modulated carrier from the carrier frequency to a lower baseband frequency range that includes DC. Circuitry within ZIF receiver 11 provides a null response at DC to a receiver response of ZIF receiver 11. The carrier frequency is translated to a lower frequency determined by a difference between the carrier frequency and the LO frequency which is nominally the offset amount. In the present embodiment, the LO frequency is set to a lower frequency than the carrier frequency.

Figure 2:
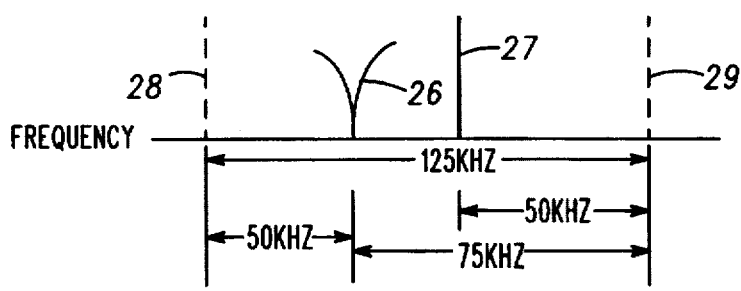
FIG. 2 is a spectral representation of local oscillator offset from a carrier frequency for the ZIF receiver of FIG. 1.

Turning now to FIG. 2, a spectral representation is shown illustrating a worst-case relationship between a receiver pass band null response 26 and a carrier frequency 27. A nominal LO frequency 28 is shown, for illustration purposes, 125 kHz (kilohertz) below a nominal carrier frequency 29. Minimum carrier frequency 27 is shown at 50 kHz below nominal carrier frequency 29 as a worst-case condition. A maximum LO frequency, where null response 26 in the receiver pass band characteristic appears as a worst-case condition is shown at 75 kHz below nominal carrier frequency 29. An approximate absolute value of frequency error in carrier frequency is 50 kHz. An approximate absolute value of frequency error in the LO frequency is also 50 kHz. A sum of the absolute values of frequency errors is 100 kHz. The separation between nominal carrier frequency 29 and nominal LO frequency 28 is 125 kHz. A guard band (of 25 kHz in this illustration), therefore, separates minimum carrier frequency 27 from the maximum LO frequency corresponding to receiver pass band null 26 with adequate margin to keep the carrier frequency with associated error and the LO frequency with associated error from coinciding.

Offsetting the LO frequency from the carrier frequency such that the null in the receiver pass band of a ZIF receiver is completely outside the spectrum of the modulated carrier is known, e.g., from Gehring, et. al., U.S. Pat. No. 4,944,025 (which is incorporated herein by reference), but requires that the receiver pass band be extended significantly beyond the modulated carrier spectrum bandwidth. A feature of the present embodiment is that the offset amount between the carrier frequency and the LO frequency is determined by the frequency errors of the carrier frequency and the LO frequency. Unlike prior methods, the offset amount does not require the receiver LO frequency to be outside a spectrum of the modulated carrier signal to prevent spectral components of the down-converted modulated carrier signal from coinciding in frequency with the null response of the receiver pass band characteristic. This can be done by exploiting common features of modulation formats used in wireless data communications systems. Such include a signaling mode that generates discreet line spectra at the carrier frequency and multiples of a signaling rate and a data mode that generates a quasi-continuous noise-like spectrum. In the signaling mode, the signaling rate is typically much higher than the sum of the absolute frequency operating errors of the receivers and transmitters. This permits offsetting by this sum plus a small guard band to guarantee non-coincidence of any spectral component with the null. In the data mode, a very small portion of the energy in the quasi-continuous spectrum will fall on the null response, but because it is so small, there will be no significant distortion imposed on the demodulated signal.

Allowing the LO frequency to remain within the spectrum of the modulated carrier signal reduces bandwidth requirements of the receiver pass band characteristic. Reducing the bandwidth requirement simplifies receiver design and improves sensitivity by reducing the noise bandwidth of ZIF receiver 11. Referring to FIG. 1, a demodulated receiver output signal is provided by a ZIF receiver output 13. In the present embodiment, the demodulated receiver output signal is a replica of a signal used to modulate the carrier frequency of the receiver RF input signal.

Referring again to FIG. 1, a receiver local oscillator modulation input signal is coupled to modulation input 17 of receiver LO synthesizer 15. In receive mode the modulation input signal has a constant level consistent with the LO frequency determined as described above. During a transmit mode, a transmit data modulation signal is coupled to transmit data input 25 of transmit synthesizer 22 resulting in a modulated transmit carrier signal provided by transmit output 24. The receiver LO modulation input signal has a substantially symmetrical square wave characteristic having maximum and minimum values which when averaged over time equal the constant level during the receive mode. Maintaining this format for the LO modulation signal permits reverting to the constant level after the completion of an integral number of full square wave cycles with very little disruption of the LO frequency. This would occur when the transceiver changes operation back to the receive mode and is important when the LO is implemented with a PLL (phase locked loop) that would otherwise be thrown off frequency with an attendant long reacquisition time. The receiver LO modulation input signal modulates the LO frequency producing an LO spectrum with spectral components well outside a transmit channel bandwidth and suppresses the LO frequency itself. In the present embodiment, the receiver LO synthesizer is square wave angle modulated and the receiver LO modulation input signal magnitude characteristics correspond to a modulation index (peak frequency deviation divided by modulation frequency) of 2.0. A modulation index of 2.0 results in a suppressed LO frequency and, if using square wave angle modulation, only odd multiples of the LO modulation frequency present in the LO spectrum.

It should be appreciated that suppressing the LO center frequency component through modulating the LO frequency is not limited to square wave angle modulation with the modulation index of 2.0. Any form of modulation of the LO frequency in which applying the modulating waveform to modulate the receive LO signal such that an LO center frequency component is substantially nulled may be used (e.g., sine wave modulation using a Bessel null, or triangle or other waveforms being symmetrical about a value). This includes amplitude modulation such as double sideband/suppressed carrier, which can be achieved using a double-balanced mixer as a multiplier. Generally, an angle modulation approach is preferred because of simpler implementation. It is a feature of the present embodiment that the LO signal is modulated to suppress the LO center frequency component during transmit mode. The LO frequency source continuously operates during transmit mode so that when transceiver 10 changes operation to receive mode, the LO frequency source requires very little time to stabilize. Allowing transceiver 10 to change modes quickly from transmit mode to receive mode thus increases data throughput.

The necessity of modulating the LO frequency to suppress the LO center frequency component during transmit mode arises from the difficulty in achieve sufficiently large amounts of isolation between the transmitter and receiver operating at the same frequency in a common transceiver package. However, with appropriate modulation of the receiver LO frequency, no spectral component of the modulated transmit carrier will coincide with the spectral components of the modulated LO frequency. Suppressing the LO center frequency component reduces down-converted modulated transmitter carrier spectral components that occur near zero Hz or DC. Although the coincidence of spectral components of a data modulated carrier with the null response may not be a significant issue in some receive modes, e.g., for systems employing an offset for the receiver LO, the situation is not as benign in the transmit mode. In the transmit mode, the receiver should be in a settled state to permit a rapid change back to the receive mode. With random data modulation on the transmitter frequency, however, some small amount of energy will coincide with the receiver null response, thereby producing transients that cause ZIF receiver 11 to be in a desensitized state when the transceiver reverts to the receive mode. Modulation of the receiver LO frequency will maintain ZIF receiver sensitivity directly after changing from transmit mode to receive mode—which is necessary for high throughput operation.

It should be apparent from the foregoing description that transceiver 10 is a single frequency duplex transceiver which achieves high throughput operation with ZIF receiver 11. Transceiver 10 achieves high throughput operation using a method of reducing receiver latency time due to receiver response to carrier spectral components of a modulated carrier frequency within the receiver bandwidth or pass band. During receive mode, the receiver LO frequency is offset from the carrier frequency within the receiver pass band as determined by worst case errors in the carrier frequency and the LO frequency. During transmit mode, the receiver LO frequency is modulated in such a way as to suppress the LO center frequency component in the modulated spectrum.

However, one skilled in the art will appreciate that there are many variations that are possible for the present invention, only a limited number of which have been described in detail above. Thus, for example, while the embodiment above describes application to elements described in terms of specific logical/functional/circuitry relationships, one skilled in the art will appreciate that such may be implemented in a variety of ways, e.g., by appropriately configured and programmed processors, ASICs (application specific integrated circuits), and DSPs (digital signal processors), but also by hardware components, or some combination thereof. Thus, it should be understood that the invention is not limited by the foregoing description of a preferred embodiment, but embraces all such alterations, modifications, and variations in accordance with the spirit and scope of the appended claims.

I claim:

1. A receiver comprising:
    a zero intermediate frequency (ZIF) receiver having a receiver bandwidth and a first input for receiving a carrier frequency having an associated carrier frequency error; and
    a receiver local oscillator source having an output which couples a local oscillator frequency to a second input of the ZIF receiver, the local oscillator frequency being offset in frequency from the carrier frequency by an offset greater than a sum of an absolute value of frequency error in the receive local oscillator and an absolute value of the frequency error in the carrier.

2. A receiver comprising:
    a zero intermediate frequency (ZIF) receiver having a receiver bandwidth and a first input for receiving a carrier frequency having an associated carrier frequency error; and a receiver local oscillator source having an output which couples a local oscillator frequency to a second input of the ZIF receiver, the local oscillator frequency being offset in frequency from the carrier frequency by an offset within the receiver bandwidth, wherein the local oscillator source is such that the local oscillator frequency is less than the carrier frequency, wherein the local oscillator frequency has a local oscillator frequency error, the offset of the local oscillator frequency is below the carrier frequency, the local oscillator source being set such that the offset is greater than a sum of the carrier frequency error and the local oscillator frequency error.

3. A receiver comprising:

a zero intermediate frequency (ZIF) receiver having a receiver bandwidth and a first input for receiving a carrier frequency having an associated carrier frequency error; and a receiver local oscillator source having an output which couples a local oscillator frequency to a second input of the ZIF receiver, the local oscillator frequency being offset in frequency from the carrier frequency by an offset within the receiver bandwidth, wherein the local oscillator source is set such that the local oscillator frequency is greater than the carrier frequency, wherein the local oscillator frequency has a local oscillator frequency error, the offset of the local oscillator frequency is greater than the carrier frequency, and the local oscillator source is set such that the offset is greater than a sum of the carrier frequency error and the local oscillator frequency error.

4. A method of reducing receiver latency time due to receiver response within a receiver bandwidth to carrier spectral components of a modulated career frequency, comprising:

offsetting a receive local oscillator frequency in a receive mode from the carrier frequency such that a center frequency component of the receive local oscillator frequency is offset from the carrier frequency by an amount greater than the sum of an absolute value of frequency errors of the carrier frequency and an absolute value of frequency errors of the receive local oscillator.

5. A method of reducing receiver latency time due to receiver response within a receiver bandwidth to carrier spectral components of a modulated carrier frequency, comprising:

offsetting a receive local oscillator frequency in a receive mode from the carrier frequency such that a center frequency component of the receive local oscillator frequency is offset from the carrier frequency by an amount determined by frequency errors of the carrier frequency and the receive local oscillator frequency, wherein offsetting the receive local oscillator frequency in receive mode from the carrier frequency by an amount determined by a frequency error of the carrier frequency and a frequency error of the receive local oscillator frequency includes determining an amount of frequency offset greater than a sum of an absolute value of the frequency error of the receive local oscillator frequency and an absolute value of the frequency error of the carrier frequency resulting from one of a group consisting of one of a minimum or maximum of the carrier frequency and one of a minimum or maximum of the receive local oscillator frequency.

6. A method of reducing receiver latency time due to receiver response within a receiver bandwidth to carrier spectral components of a modulated carrier frequency, comprising:

offsetting a receive local oscillator frequency in a receive mode from the carrier frequency such that a center frequency component of the receive local oscillator frequency is offset from the carrier frequency by an amount determined by frequency errors of the carrier frequency and the receive local oscillator frequency, wherein offsetting the receive local oscillator frequency in receive mode from the carrier frequency by an amount determined by a frequency error of the carrier frequency and a frequency error of the receive local oscillator frequency includes determining an amount of frequency offset greater than a sum of an absolute value of the frequency error of the receive local oscillator frequency and an absolute value of the frequency error of the carrier frequency resulting from one of a group consisting of one of a minimum or maximum of the carrier frequency and one of a minimum or maximum of the receive local oscillator frequency wherein determining the amount of frequency offset includes setting the receive local oscillator frequency to a lower frequency than the carrier frequency, and setting the frequency offset to a margin value greater than a separation between a minimum carrier frequency and a maximum receive local oscillator frequency.

7. A method of reducing receiver latency time due to receiver response within a receiver bandwidth to carrier spectral components of a modulated carrier frequency, comprising:

offsetting a receive local oscillator frequency in a receive mode from the carrier frequency such that a center frequency component of the receive local oscillator frequency is offset from the carrier frequency by an amount determined by frequency errors of the carrier frequency and the receive local oscillator frequency, wherein offsetting the receive local oscillator frequency in receive mode from the carrier frequency by an amount determined by a frequency error of the carrier frequency and a frequency error of the receive local oscillator frequency includes determining an amount of frequency offset greater than a sum of an absolute value of the frequency error of the receive local oscillator frequency and an absolute value of the frequency error of the carrier frequency resulting from one of a group consisting of one of a minimum or maximum of the carrier frequency and one of a minimum or maximum of the receive local oscillator frequency, wherein determining the amount of frequency offset includes setting the local oscillator frequency to a higher frequency than the carrier frequency and setting the frequency offset to a margin value greater than a separation between a maximum carrier frequency and a minimum receive local oscillator frequency.

* * * * *